US009973506B2

(12) United States Patent
Yuan et al.

(10) Patent No.: US 9,973,506 B2
(45) Date of Patent: May 15, 2018

(54) METHOD AND APPARATUS FOR CLEARING NOTIFICATION ICON, AND STORAGE MEDIUM

(71) Applicant: Tencent Technology (Shenzhen) Co., Ltd., Shenzhen, Guangdong (CN)

(72) Inventors: Cancai Yuan, Guangdong (CN); Quanhao Xiao, Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 69 days.

(21) Appl. No.: 14/812,763

(22) Filed: Jul. 29, 2015

(65) Prior Publication Data

US 2015/0334118 A1 Nov. 19, 2015

Related U.S. Application Data

(63) Continuation of application No. PCT/CN2013/087629, filed on Nov. 21, 2013.

(30) Foreign Application Priority Data

Jan. 30, 2013 (CN) .......................... 2013 1 0036203

(51) Int. Cl.
*G06F 17/00* (2006.01)
*H04L 29/06* (2006.01)
(Continued)

(52) U.S. Cl.
CPC ........ *H04L 63/101* (2013.01); *G06F 3/04817* (2013.01); *H04L 67/10* (2013.01); *H04M 1/72522* (2013.01)

(58) Field of Classification Search
CPC .................................................. G06F 3/04817
(Continued)

(56) References Cited

U.S. PATENT DOCUMENTS 8,364,123 B2 * 1/2013 Marcellino ......... H04W 36/385
455/3.01
8,396,463 B2 * 3/2013 Marcellino ........... H04L 12/587
455/403

(Continued)

FOREIGN PATENT DOCUMENTS

| CN | 102467318 A | 5/2012 |
|----|-------------|--------|
| CN | 102541392 A | 7/2012 |
| CN | 102541429 A | 7/2012 |

OTHER PUBLICATIONS

International Search Report received in PCT Application No. PCT/CN2013/087629 dated Feb. 27, 2014.

*Primary Examiner* — Morshed Mehedi
*Assistant Examiner* — Khalil Naghdali
(74) *Attorney, Agent, or Firm* — Morgan, Lewis & Bockius LLP

(57) ABSTRACT

The present disclosure discloses a method and an apparatus for clearing a notification icon, and a storage medium. The method includes: acquiring a list of applications corresponding to to-be-cleared notification icons, the application list including application identifiers of the applications corresponding to the to-be-cleared notification icons; and stop displaying a notification icon corresponding to the application identifier, when a clearing command is received and according to each application identifier included in the application list. By determining application identifiers of applications corresponding to to-be-cleared notification icons, displaying of notification icons corresponding to the application identifiers can be stopped at once according to the application identifiers of the applications of the to-be-cleared notification icons when a clearing command is received. Hence, notification message prompts which a user does not care about are cleared quickly, and unwanted (Continued)

distraction is avoided when messages are reduced, and the operation is simple and convenient.

13 Claims, 2 Drawing Sheets

(51) Int. Cl.
*H04L 29/08* (2006.01)
*G06F 3/0481* (2013.01)
*H04M 1/725* (2006.01)

(58) Field of Classification Search
USPC .............................................................. 726/1
See application file for complete search history.

(56) References Cited

U.S. PATENT DOCUMENTS

| | | | | |
|---|---|---|---|---|
| 8,543,665 B2* | 9/2013 | Ansari | ................... | G06Q 30/04 |
| | | | | 709/218 |
| 9,507,608 B2* | 11/2016 | Chaudhri | ............... | G06F 9/4443 |
| 2001/0035881 A1* | 11/2001 | Stoakley | ............... | G06F 3/0481 |
| | | | | 715/772 |
| 2009/0249247 A1* | 10/2009 | Tseng | ................ | H04M 1/72552 |
| | | | | 715/808 |
| 2009/0305732 A1* | 12/2009 | Marcellino | ............. | H04L 51/24 |
| | | | | 455/466 |
| 2010/0088622 A1* | 4/2010 | Sun | .................... | G06F 3/04817 |
| | | | | 715/765 |
| 2012/0317498 A1* | 12/2012 | Logan | .................... | H04L 51/24 |
| | | | | 715/752 |
| 2014/0237378 A1* | 8/2014 | Gonen | ............. | H04M 1/72519 |
| | | | | 715/745 |

* cited by examiner

METHOD AND APPARATUS FOR CLEARING NOTIFICATION ICON, AND STORAGE MEDIUM

RELATED APPLICATION

The present application is a continuation application of PCT/CN2013/087629, filed on Nov. 21, 2013, and titled "METHOD AND APPARATUS FOR CLEARING NOTIFICATION ICON, AND STORAGE MEDIUM", which claims priority to Chinese Patent Application No. 201310036203.1, filed by Tencent Technology (Shenzhen) Company Limited on Jan. 30, 2013, and titled "METHOD AND APPARATUS FOR CLEARING NOTIFICATION ICON", which is incorporated by reference in their entireties herein.

FIELD OF THE TECHNOLOGY

The present disclosure relates to the field of terminal devices, and in particular, to a method and an apparatus for clearing a notification icon and a storage medium.

BACKGROUND OF THE DISCLOSURE

With the development of network technologies and terminal technologies, various applications (App) can be installed on a mobile terminal, and a user can implement various functions including webpage browsing, chatting, and the like by using installed applications. When applications need to be updated or perform message notification for a user, notification icons may be displayed on application identifiers displayed on an interface of a mobile terminal.

In the existing technology, if a notification icon displayed on an application identifier needs to be removed, a user needs to tap to enter the application and execute each update represented by the notification icon of the application, so as to remove the notification icon.

In the process of implementing the present disclosure, the inventor has found that the existing technology has at least the following problem:

Excessive notification icons cause clutter on a notification interface of a user desktop, which brings much distraction during normal use by a user; and to remove a notification icon, all updates represented by the notification icons need to be executed, which is a complex operation process and brings much distraction for users who do not care about application updates.

SUMMARY

To address the problem of the existing technology, embodiments of the present invention provide a method and an apparatus for clearing a notification icon, and a storage medium. The technical solutions are as follows:

According to a first aspect, the embodiments of the present invention provide a method for clearing a notification icon, including:

acquiring a list of applications corresponding to to-be-cleared notification icons, the application list including application identifiers of the applications corresponding to the to-be-cleared notification icons; and stop displaying a notification icon corresponding to the application identifier, when a clearing command is received and according to each application identifier included in the application list.

With reference to the first aspect, in a first possible implementation manner of the embodiments of the present invention, the acquiring a list of applications corresponding to to-be-cleared notification icons includes:

acquiring an application identifier of an application corresponding to a currently-displayed notification icon; and adding, according to the application identifier of the application corresponding to the notification icon and a preset rule, the application identifier that is of the application corresponding to the notification icon and meets the preset rule to the application list.

With reference to the first aspect, in a second possible implementation manner of the embodiments of the present invention, the acquiring a list of applications corresponding to to-be-cleared notification icons further includes:

acquiring, when a notification icon display request is detected, an application identifier of an application corresponding to a notification icon requested to be played; and determining whether the application identifier of the application corresponding to the notification icon meets a preset rule, and adding the application identifier to the application list if the application identifier meets the preset rule.

With reference to the first or second possible implementation manner of the embodiments of the present invention, in a third implementation manner of the embodiments of the present invention, before the acquiring a list of applications corresponding to to-be-cleared notification icons, the method further includes:

receiving the preset rule, where the preset rule is a first preset rule or a second preset rule, the first preset rule includes an application identifier of an application whose notification icon is allowed to be cleared when the clearing command is received, and the second preset rule includes an application identifier of an application whose notification icon is not allowed to be cleared when the clearing command is received.

With reference to the first aspect, in a fourth possible implementation manner of the embodiments of the present invention, the application list further includes the numbers of notifications indicated by the to-be-cleared notification icons, and correspondingly, after the stopping, when a clearing command is received and according to each application identifier included in the application list, displaying a notification icon corresponding to the application identifier, the method further includes:

calculating a sum of the numbers of notifications indicated by the notification icons stopped being displayed, and outputting the sum of the numbers of notifications as a statistical result.

With reference to the first aspect, in a fifth possible implementation manner of the embodiments of the present invention, the stopping, when a clearing command is received and according to each application identifier included in the application list, displaying a notification icon corresponding to the application identifier includes:

invoking, when the clearing command is received and according to the application identifier of the application corresponding to the to-be-cleared notification icon, an application programming interface API configured to set displaying of a notification icon, to stop displaying on a user interface the notification icon corresponding to the application identifier.

According to a second aspect, the embodiments of the present invention further provide an apparatus for clearing a notification icon, including at least one processor and a memory having processor-executable instructions stored therein, and the instructions when executed by the at least one processor, configure the apparatus to:

acquire a list of applications corresponding to to-be-cleared notification icons, the application list including application identifiers of the applications corresponding to the to-be-cleared notification icons; and stop displaying a notification icon corresponding to the application identifier, when a clearing command is received and according to each application identifier included in the application list.

With reference to the second aspect, in a first possible implementation manner of the embodiments of the present invention, the apparatus is configured to:

acquire an application identifier of an application corresponding to a currently-displayed notification icon; and add the application identifier to the application list, according to the application identifier of the application corresponding to the notification icon and a preset rule, the application identifier that is of the application corresponding to the notification icon and meeting the preset rule to the application list.

With reference to the second aspect, in a second possible implementation manner of the embodiments of the present invention, the list acquiring module includes:

a second application identifier acquiring unit, configured to acquire, when a notification icon display request is detected, an application identifier of an application corresponding to a notification icon requested to be played; and a rule determining unit, configured to determine whether the application identifier of the application corresponding to the notification icon meets a preset rule, and add the application identifier to the application list if the application identifier meets the preset rule.

With reference to the first or second possible implementation manner of the embodiments of the present invention, in a third implementation manner of the embodiments of the present invention, the apparatus further includes:

a rule receiving module, configured to receive the preset rule, where the preset rule is a first preset rule or a second preset rule, the first preset rule includes an application identifier of an application whose notification icon is allowed to be cleared when the clearing command is received, and the second preset rule includes an application identifier of an application whose notification icon is not allowed to be cleared when the clearing command is received.

With reference to the second aspect, in a fourth possible implementation manner of the embodiments of the present invention, the application list further includes the numbers of notifications indicated by the to-be-cleared notification icons, and correspondingly, the apparatus further includes:

a counting module, configured to calculate a sum of the numbers of notifications indicated by the notification icons stopped being displayed, and output the sum of the numbers of notifications as a statistical result.

With reference to the second aspect, in a fifth possible implementation manner of the embodiments of the present invention, the notification icon removing module includes:

a notification icon removing unit, configured to invoke, when the clearing command is received and according to the application identifier of the application corresponding to the to-be-cleared notification icon, an application programming interface API configured to set displaying of a notification icon, to stop displaying on a user interface the notification icon corresponding to the application identifier.

According to a third aspect, the embodiments of the present invention further provide a storage medium including computer executable instructions, the computer executable instructions being used for executing a method for clearing a notification icon when executed by a computer processor, and the method including:

acquiring a list of applications corresponding to to-be-cleared notification icons, the application list including application identifiers of the applications corresponding to the to-be-cleared notification icons; and stopping, when a clearing command is received and according to each application identifier included in the application list, displaying a notification icon corresponding to the application identifier.

According to the method and the apparatus for clearing a notification icon, and the storage medium including computer executable instructions provided in the embodiments of the present invention, a list of applications corresponding to to-be-cleared notification icons is acquired, where the application list includes application identifiers of the applications corresponding to the to-be-cleared notification icons, and when a clearing command is received, displaying of notification icons corresponding to application identifiers is stopped according to the application identifiers included in the application list. When the technical solutions provided in the present disclosure are used, application identifiers of applications corresponding to to-be-cleared notification icons are determined, so that when a clearing command is received, displaying of the notification icons corresponding to the application identifiers can be stopped at once according to the determined application identifiers. In this way, notification message prompts not cared about are cleared quickly, and unwanted distraction is avoided when messages are reduced, and the operation is simple and convenient.

BRIEF DESCRIPTION OF THE DRAWINGS

To describe the technical solutions of the embodiments of the present invention more clearly, the following briefly introduces the accompanying drawings required for describing the embodiments. Certainly, the accompanying drawings in the following description show only some embodiments of the present invention, and a person of ordinary skill in the art may modify or replace these accompanying drawings without creative efforts.

DESCRIPTION OF EMBODIMENTS

The following clearly and completely describes the technical solutions in the embodiments of the present invention with reference to the accompanying drawings. Apparently, the described embodiments are some of the embodiments of the present invention rather than all of the embodiments, and are intended for explaining the principles of the present disclosure rather than limiting the present disclosure to these specific embodiments. All other embodiments obtained by a person of ordinary skill in the art based on the embodiments of the present invention and without creative work shall fall within the protection scope of the present disclosure.

In the embodiments of the present invention, a terminal device refers to a device that provides audio and/or data connectivity for a user, including a wireless terminal or a wired terminal. The wireless terminal may be a portable device having a wireless connection function or another processing device connected to a wireless modem. The wireless terminal communicates with one or more core networks via a wireless access network. For example, the wireless terminal may be a mobile phone (or referred to as a cell phone) or a computer having a mobile terminal. For example, the wireless terminal may also be a portable, pocket-size, handheld, computer built-in, or vehicle-mounted mobile apparatus.

Figure 1:
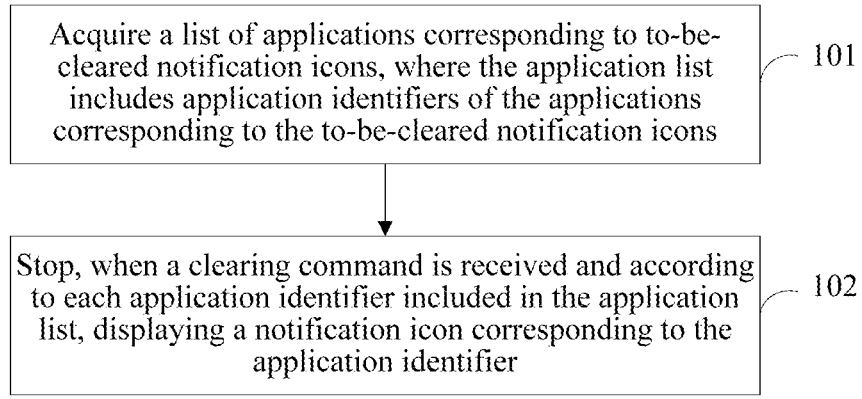
FIG. 1 is a flowchart of a method for clearing a notification icon provided in an embodiment of the present invention.

FIG. 1 is a flowchart of a method for clearing a notification icon provided in an embodiment of the present invention. This embodiment of the invention is executed by a terminal device. Referring to FIG. 1, the method includes:

101: Acquire a list of applications corresponding to to-be-cleared notification icons, where the application list includes application identifiers of the applications corresponding to the to-be-cleared notification icons.

The applications refer to third-party application programs that are installed in the terminal device and used to implement various functions and application programs that come with an operating system. Each application has an application icon and a corresponding application identifier, so as to make it convenient to distinguish the applications. The application identifier may be an application name or an application ID.

An application icon of each application may be displayed on a user interface of the terminal device, and a user may trigger the application by tapping the application icon.

The notification icon refers to an icon displayed on a corresponding application icon when the application needs to be updated or perform message notification for a user. The notification icon may be displayed on the top, the bottom, an upper-right corner, or the like of the application icon, and a display position of the notification icon is not specifically limited in the embodiments of the present invention.

The list of the applications corresponding to the to-be-cleared notification icons is generated according to a notification icon display request received by the terminal device. When any application is updated or needs to perform message notification, the application sends a notification icon display request to a display layer. When receiving the notification icon display request to the display layer, the terminal device displays a notification icon, acquires a corresponding application identifier, and generates a to-be-cleared-application list according to a preset rule.

102: Stop, when a clearing command is received and according to each application identifier included in the application list, displaying a notification icon corresponding to the application identifier.

The clearing command is a command used for clearing a notification icon. The clearing command may be triggered by a designated operation. The designated operation may be a tap operation on a designated key by a user or a shake operation on a mobile terminal by a user. The designated operation may be set by a technician during development or be set by a user.

When a clearing command is received, a display layer is instructed, according to each application identifier included in the application list, to stop displaying the notification icons corresponding to the application identifiers, so that the display layer stops displaying the notification icons corresponding to the application identifiers of the applications of the to-be-cleared notification icons.

It should be noted that the terminal device displays a notification icon corresponding to the application identifier by configuring a display layer. In this embodiment of the present invention, by instructing the display layer to selectively shield a notification icon, displaying of the notification icon is stopped, so that the cleared notification icon is no longer displayed on the user interface, but no processing is performed for an actual update, notification, or the like corresponding to the notification icon, thereby clearing the display interface without ignoring updating of an application.

The user interface may be an application program management interface, a desktop interface of an operating system, or the like.

According to the method for clearing a notification icon provided in this embodiment of the present invention, a list of applications corresponding to to-be-cleared notification icons is acquired, where the application list includes application identifiers of the applications corresponding to the to-be-cleared notification icons, and displaying of a notification icon corresponding to each application identifier is stopped according to the application identifiers included in the application list when a clearing command is received. When the technical solutions provided in the present disclosure are used, application identifiers of applications corresponding to to-be-cleared notification icons are determined, so that when a clearing command is received, displaying of the notification icons corresponding to the application identifiers can be stopped at once according to the determined application identifiers. In this way, notification message prompts which a user does not care about are cleared quickly, and unwanted distraction is avoided when messages are reduced, and the operation is simple and convenient.

Figure 2:
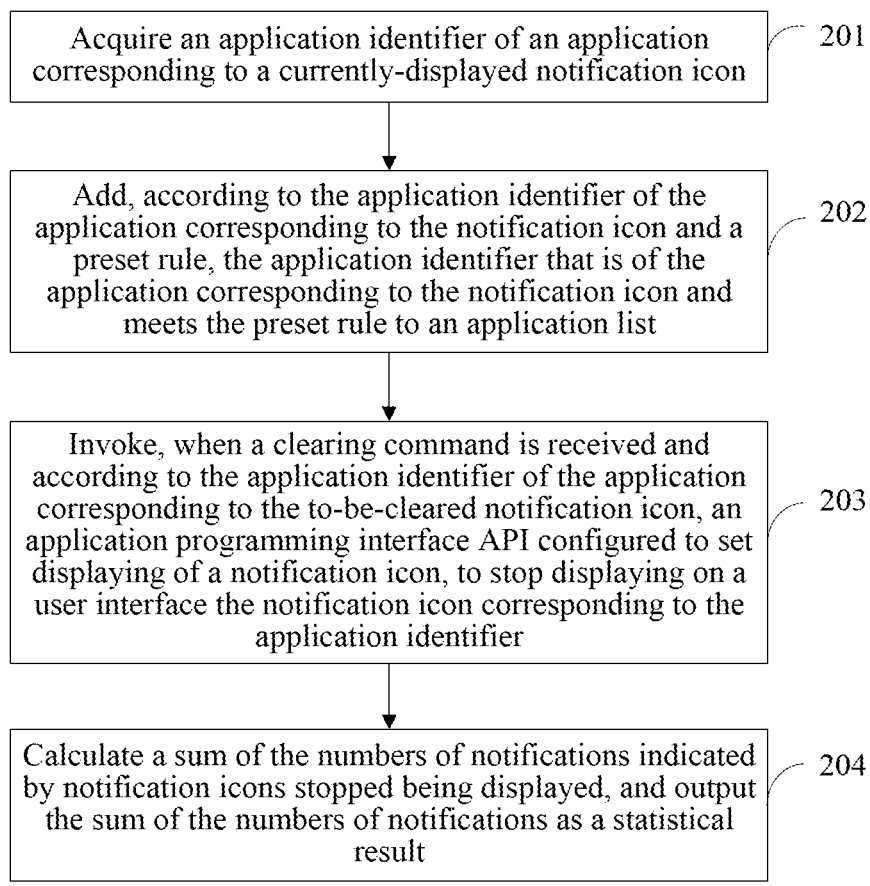
FIG. 2 is a flowchart of a method for clearing a notification icon provided in an embodiment of the present invention.

FIG. 2 is a flowchart of a method for clearing a notification icon provided in an embodiment of the present invention. This embodiment of the invention is executed by a terminal device. Referring to FIG. 2, the method includes:

201: Acquire an application identifier of an application corresponding to a currently-displayed notification icon.

The terminal device acquires an application identifier corresponding to a notification icon displayed on a current user interface. The form of the notification icon may be set by a developer, or may be customized by a user. Preferably, the notification icon may be a prominent red dot and the number of notifications indicated by the notification icon may be displayed on the notification icon.

202: Add, according to the application identifier of the application corresponding to the notification icon and a preset rule, the application identifier that is of the application corresponding to the notification icon and meets the preset rule to an application list.

Further, before step 201 and step 202, the method may further include: receiving the preset rule, where the preset rule is used for determining an application identifier of an application whose notification icon needs to be cleared. The preset rule is a first preset rule or a second preset rule. The first preset rule includes an application identifier of an application corresponding to a notification icon that is allowed to be cleared when the clearing command is received, that is, a black list. The second preset rule includes an application identifier of an application corresponding to a notification icon that is not allowed to be cleared when the clearing command is received, that is, a white list. The preset rule may be set by a developer or may be customized by a terminal device user.

The step of receiving the preset rule and step 201 are not necessarily performed successively, as long as the step of receiving the preset rule is performed before step 201. Certainly, in a process of using the terminal device, a user may adjust the setting of the preset rule as desired by the user or as recommended by a network security application, so as to improve clearing efficiency and security.

Optionally, the first preset rule, that is, the black list, may be used to filter notification icons, and by determining whether the black list includes the acquired application identifier, it is determined whether the acquired application identifier meets the preset rule. Specifically, if the black list includes the acquired application identifier, it is considered that the notification icon corresponding to the acquired application identifier can be cleared, the acquired application identifier meets the preset rule, and the acquired application identifier is added to the to-be-cleared list; if the black list does not include the acquired application identifier, it is considered that the notification icon corresponding to the acquired application identifier cannot be cleared, the acquired application identifier does not meet the preset rule, and the application identifier is not processed.

For example, if each of a dictionary, an electronic book, and instant messaging applications A and B on a current user interface has a notification icon and a black list includes application identifiers of the dictionary and the electronic book. It is determined whether the black list includes application identifiers of the dictionary, the electronic book, and the instant messaging applications A and B. If the black list includes the application identifiers of the dictionary and the electronic book currently, the dictionary and the electronic book meet the preset rule and the application identifiers corresponding to the dictionary application and the electronic book application are added to the to-be-cleared list. If the black list does not include the application identifiers of the instant messaging application A or B, the instant messaging applications A and B do not meet the preset rule and are not processed.

Optionally, the second preset rule, that is, the white list, may be used to filter notification icons, and by determining whether the white list includes the acquired application identifier, it is determined whether the acquired application identifier meets the preset rule. Specifically, if the white list does not include the acquired application identifier, it is considered that the notification icon corresponding to the acquired application identifier can be cleared, the acquired application identifier meets the preset rule, and the acquired application identifier is added to the to-be-cleared list; if the white list includes the acquired application identifier, it is considered that the notification icon corresponding to the acquired application identifier cannot be cleared, the acquired application identifier does not meet the preset rule, and the application identifier is not processed.

For example, if each of a dictionary, an electronic book, and instant messaging applications A and B on a current user interface has a notification icon and a white list includes application identifiers of the dictionary and the electronic book. It is determined whether the white list includes application identifiers of the dictionary, the electronic book, and the instant messaging applications A and B. If the white list includes the application identifiers of the dictionary and the electronic book currently, the dictionary and the electronic book do not meet the preset rule and are not processed. If the white list does not includes the application identifiers of the instant messaging application A or B, the instant messaging applications A and B meet the preset rule and the application identifiers corresponding to the instant messaging applications A and B are added to the to-be-cleared list.

In another implementation manner provided in this embodiment of the present invention, step 201 and step 202 may be replaced by the following steps: acquiring, when a notification icon display request is detected, an application identifier of an application corresponding to a notification icon requested to be played; determining whether the application identifier of the application corresponding to the notification icon meets a preset rule; if the application identifier of the application corresponding to the notification icon meets the preset rule, adding the application identifier to the application list; and if the application identifier of the application corresponding to the notification icon does not meet the preset rule, ending the process. Specifically, when any application on the terminal device needs to be updated or perform message notification for a user, the application sends a notification icon display request to the display layer. When detecting a notification icon display request of any application, the terminal device determines whether an application identifier of the application meets the preset rule, and if the application identifier of the application meets the preset rule, adds the application identifier of the application to the to-be-cleared-application list.

The preset rule may be the foregoing black list or white list. The black list includes an application identifier of an application whose notification icon is allowed to be cleared when the clearing command is received, or the white list includes an application identifier of an application whose notification icon is not allowed to be cleared when the clearing command is received. A process of filtering notification icons according to the preset rule is similar to step 202, which is not described again herein.

The preset rule being the black list is used as an example. When a notification icon display request of a dictionary application is detected, it is determined whether the black list includes an application identifier of the dictionary. If the black list includes the application identifier of the dictionary, the dictionary application meets the preset rule and the application identifier of the dictionary is added to the to-be-cleared-application list. If the black list does not include the identifier of the dictionary, the dictionary application does not meet the preset rule and the application identifier of the dictionary is not processed.

The to-be-cleared-application list further includes the numbers of notifications indicated by the to-be-cleared notification icons of the applications.

In this embodiment of the present invention, by setting a preset rule, for example, a black list or a white list, wrong clearing of a notification icon of an application can be avoided, and notification icons are filtered, so that a user can pay attention to an application which the user cares about and distraction can be prevented.

203: Invoke, when a clearing command is received and according to the application identifier of the application corresponding to the to-be-cleared notification icon, an application programming interface (API) configured to set displaying of a notification icon, to stop displaying the notification icon corresponding to the application identifier on a user interface.

The application programming interface API is configured to set displaying of a notification icon and the number of notifications indicated by the notification icon. By setting of the invoked application programming interface API, displaying or not displaying of a notification icon of any application and the number of notifications indicated by the notification icon can be implemented.

Specifically, when a clearing command is received, application identifiers included in the application list are acquired. Once an application identifier is acquired, displaying of a notification icon corresponding to the application identifier is stopped by invoking the API. By stopping, one by one, displaying notification icons corresponding to applications, displaying of a notification icon corresponding to an application identification of an application of each to-be-cleared notification icon on the user interface is stopped.

Different from the existing technology, in this embodiment of the present invention, by simulating invoking of the API by application identifiers during clearing notification icons, an objective of stopping displaying the notification icons is achieved without executing the applications, thereby improving clearing efficiency.

It should be noted that each notification icon on the user interface may display the number of notifications indicated by the notification icon. When displaying of a notification icon is stopped, displaying of the number of notifications corresponding to the notification icon is stopped correspondingly, and the process may be performed in any one of the following manners:

(1) When a clearing command is received, an application programming interface API configured to set displaying of a notification icon is invoked according to the list of applications corresponding to the to-be-cleared notification icons, to stop displaying on the user interface the notification icons and the numbers of notifications indicated by the notification icons. The invoked API is configured to only set, on a display layer, displaying and stopping displaying of a notification icon and the number of notifications indicated by the notification icon, and does not change a notification message in the application. That is, by invoking the API, only displaying of the notification icon on the display layer is stopped, and reading or deleting processing on a data layer is not performed on the notification message indicated by the notification icon. When the application is executed, the notification message stopped being displayed can still be viewed in update information of the application, so that normal services of the application are not affected.

After displaying of a notification icon of any application and the number of notifications indicated by the notification icon on the terminal device is stopped, once the application needs to be updated or perform message notification for a user, the application still sends an icon display request to the display layer, and requests, according to the number of unread notification messages currently included in the application, the display layer to display a notification icon corresponding to the number of the unread notification messages.

For example, a notification icon of an email application on a terminal device shows that the number of notifications indicated by the notification icon is 3, that is, the email has 3 notification messages at this time. When displaying of the notification icon of the email application is stopped according to a to-be-cleared list and by invoking a corresponding API, playing of the number "3" of notifications indicated by the notification icon is also stopped, but the 3 notification messages are still in an unread state. In a case that a user has not read the 3 notification messages, when the email application needs to notify the user of 2 new notification messages and needs to display the notification icon of the email application again, the number of notifications indicated by the notification icon that is displayed again should be 5.

(2) When a clearing command is received, application programming interfaces API configured to set displaying of a notification icon are invoked according to the list of the applications corresponding to the to-be-cleared notification icons, to stop displaying the notification icons and the numbers of notifications indicated by the notification icons on the user interface. The invoked APIs not only include an API configured to set displaying or not displaying on a display layer a notification icon and the number of notifications indicated by the notification icon, but also include an API configured to set on a data layer a state of a notification message as being read. That is, by invoking the corresponding APIs, displaying of a notification icon and the number of notifications indicated by the notification icon can be stopped, and an unread notification message can be set to be in a read state by simulating an operation of reading a notification message by a user, so that the number of notifications of the application is currently 0.

After displaying on the terminal device a notification icon of any application and the number of notifications indicated by the notification icon is stopped, once the application needs to be updated or perform message notification for a user, the application still sends an icon display request to the display layer, and requests, according to the number of unread notification messages currently included in the application, the display layer to display a notification icon corresponding to the number of the unread notification messages.

For example, a notification icon of a microblog application on a terminal device shows that the number of notifications indicated by the notification icon is 3, that is, the microblog application has 3 notification messages currently. When displaying of the notification icon of the microblog application and displaying of the number of notifications indicated by the notification icon "3" are stopped according to the to-be-cleared list and by invoking a corresponding API, an operation of reading the 3 notification messages by a user is simulated, so that after displaying of the notification icon and the number of notifications is stopped, the number, which is acquired by the display layer, of notifications of the microblog application is changed to 0. When the microblog needs to notify the user of 2 new notification messages and needs to display the notification icon of the microblog application again, the number of notifications indicated by the notification icon that is displayed again should be 2.

204: Calculate a sum of the numbers of notifications indicated by the notification icons stopped being displayed, and output the sum of the numbers of notifications as a statistical result.

Specifically, when the to-be-cleared-application list is acquired, a notification icon corresponding to each application identifier shows the number of notifications; therefore, after displaying of the notification icons corresponding to the application identifiers of the applications of the to-be-cleared notification icons on the user interface is stopped, a sum of the numbers of notifications indicated by the removed notification icons of the applications is calculated, and the statistical result is output and displayed on the user interface, so that a user directly views a clearing result.

For example, the to-be-cleared list includes application identifiers of applications A, B, and C, and the numbers of notifications indicated by notification icons of the applications A, B, and C can be acquired through step 202. When a clearing command is received, displaying of the notification icons of the applications A, B, and C is stopped, then a sum of the numbers of notifications indicated by the notification icons of the applications A, B, and C is calculated, and a result is output and displayed on the user interface.

This embodiment of the present invention is applicable to a scenario of an iphone operating system (iOS) platform, and may be a method for clearing a notification icon by selectively shielding a red dot with a number displayed on a main interface (desktop) of a terminal device on an iOS platform.

In the method for clearing a notification icon provided in this embodiment of the present invention, a to-be-cleared-application list is acquired, where the to-be-cleared-application list includes application identifiers of applications of to-be-cleared notification icons; and displaying of the notification icons corresponding to the application identifiers is stopped according to the to-be-cleared-application list when a clearing command is received. When the technical solutions provided in the present disclosure are used, application identifiers of applications corresponding to to-be-cleared notification icons are determined, so that when a clearing command is received, displaying of the notification icons corresponding to the application identifiers can be stopped at once according to the determined application identifiers. In this way, notification message prompts which a user does not care about are cleared quickly, and unwanted distraction is avoided when messages are reduced, and the operation is simple and convenient.

Figure 3:
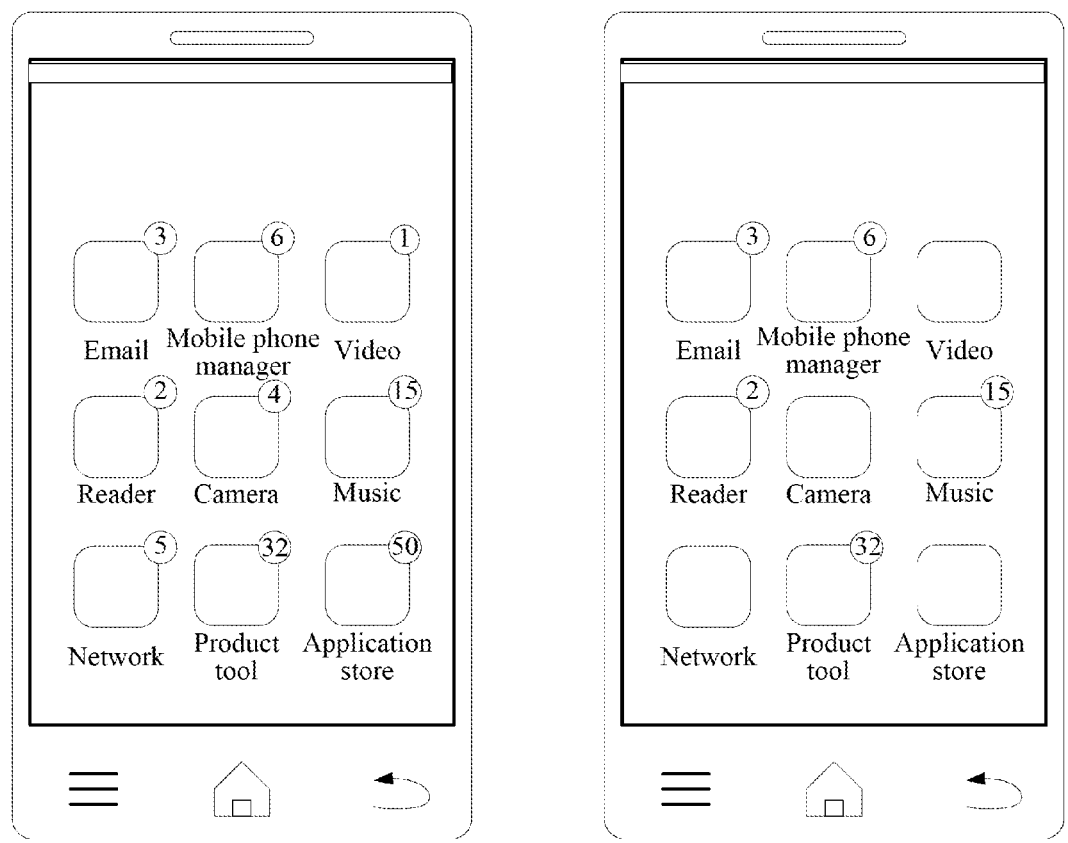
FIG. 3 is a schematic diagram of comparison of display on a user interface provided in an embodiment of the present invention.

FIG. 3 is a schematic diagram of comparison of display on a user interface of a terminal device provided in an embodiment of the present invention. The user interface includes 9 application icons. Application names are email, mobile phone manager, video, reader, camera, music, network, product tool, and application store.

On the basis of the example in FIG. 3, displayed content on the user interface is shown in the left figure of FIG. 3. At an upper-right corner of an application icon of each application, a notification icon corresponding to the application icon and the number of notifications indicated by the notification icon are displayed. After a to-be-cleared-application list is acquired, and displaying of notification icons corresponding to application identifiers is stopped according to the to-be-cleared-application list when a clearing command is received, displayed content on the user interface is shown in the right figure of FIG. 3. Displaying of notification icons of video, camera, network, and application store function and displaying of the numbers of the notifications indicated by the notification icons on the user interface are stopped.

Figure 4:
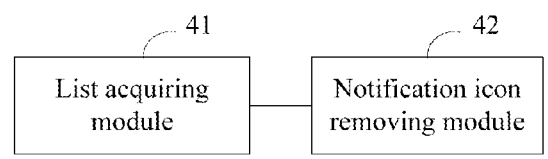
FIG. 4 is a schematic structural diagram of an apparatus for clearing a notification icon provided in an embodiment of the present invention.

FIG. 4 is a schematic structural diagram of an apparatus for clearing a notification icon provided in an embodiment of the present invention. The apparatus for clearing a notification icon may be configured to perform the methods for clearing a notification icon provided in the embodiments shown in FIG. 1 and FIG. 2. Referring to FIG. 4, the apparatus includes:

a list acquiring module 41, configured to acquire a list of applications corresponding to to-be-cleared notification icons, where the application list includes application identifiers of the applications corresponding to the to-be-cleared notification icons; and a notification icon removing module 42, configured to stop, when a clearing command is received and according to each application identifier included in the application list, displaying a notification icon corresponding to the application identifier.

Optionally, the list acquiring module 41 includes:

a first application identifier acquiring unit, configured to acquire an application identifier of an application corresponding to a currently-displayed notification icon; and a to-be-cleared-application list acquiring unit, configured to add, according to the application identifier of the application corresponding to the notification icon and a preset rule, the application identifier that is of the application corresponding to the notification icon and meets the preset rule to the application list.

Optionally, the list acquiring module 41 includes:

a second application identifier acquiring unit, configured to acquire, when a notification icon display request is detected, an application identifier of an application corresponding to a notification icon requested to be played; and a rule determining unit, configured to determine whether the application identifier of the application corresponding to the notification icon meets a preset rule, and add the application identifier to the application list if the application identifier meets the preset rule.

Optionally, the apparatus further includes:

a rule receiving module, configured to received the preset rule, where the preset rule is a first preset rule or a second preset rule, the first preset rule includes an application identifier of an application corresponding to a notification icon that is allowed to be cleared when the clearing command is received, and the second preset rule includes an application identifier of an application corresponding to a notification icon that is not allowed to be cleared when the clearing command is received.

Optionally, the to-be-cleared-application list further includes the numbers of notifications indicated by the to-be-cleared notification icons of the applications, and correspondingly, the apparatus further includes:

a counting module, configured to calculate a sum of the numbers of notifications indicated by the notification icons stopped being displayed, and output the sum of the numbers of notifications as a statistical result.

Optionally, the notification icon removing module 42 includes:

a notification icon removing unit, configured to invoke, when the clearing command is received and according to the application identifier of the application corresponding to the to-be-cleared notification icon, an application programming interface API configured to set displaying of a notification icon, to stop displaying on a user interface the notification icon corresponding to the application identifier.

In the apparatus for clearing a notification icon provided in this embodiment of the present invention, a to-be-cleared-application list is acquired, where the to-be-cleared-application list includes application identifiers of applications of to-be-cleared notification icons; and displaying of the notification icons corresponding to the application identifiers is stopped according to the to-be-cleared-application list when a clearing command is received. When the technical solutions provided in the present disclosure are used, application identifiers of applications corresponding to to-be-cleared notification icons are determined, so that when a clearing command is received, displaying of the notification icons corresponding to the application identifiers can be stopped at once according to the determined application identifiers. In this way, notification message prompts which a user does not care about are cleared quickly, and unwanted distraction is avoided when messages are reduced, and the operation is simple and convenient.

It should be noted that the above functional modules are merely for illustratively describing the apparatus for clearing a notification icon provided in the foregoing embodiment. In practical applications, the functions may be allocated to different functional modules as desired. It means that the internal structure of the terminal device is divided to different functional modules to complete all or some of the above described functions. In addition, the apparatus for clearing a notification icon provided by the foregoing embodiment is based on the same concept as the methods for clearing a notification icon in the forgoing method embodiments. Detailed implementation process may refer to the method embodiments, and the details are not described herein again.

An embodiment of the present invention further provides a storage medium including computer executable instructions, the computer executable instructions being used for executing a method for clearing a notification icon when executed by a computer processor, and the method including:

acquiring a list of applications corresponding to to-be-cleared notification icons, the application list including application identifiers of the applications corresponding to the to-be-cleared notification icons; and stopping, when a clearing command is received and according to each application identifier included in the application list, displaying a notification icon corresponding to the application identifier.

Through the foregoing description of the implementation manners, a person skilled in the art can clearly understand that the present disclosure may be implemented by means of software and necessary general hardware, and certainly may also be implemented by means of hardware. Although, in many cases, the former is a preferable implementation manner. Based on such understanding, the technical solutions of the present invention essentially or the part contributing to the prior art may be implemented in a form of a software product. The computer software product may be stored in a computer readable storage medium, such as a floppy disk, a Read-Only Memory (ROM), a Random Access Memory (RAM), a flash memory (FLASH), a hard disk or an optical disc of a computer, or may include some instructions so as to enable a computer device (which may be, for example, a personal computer, a server, or a network device) to perform the methods in the embodiments of the present invention.

The above are merely preferable embodiments of the present invention, but are not intended to limit the present disclosure. Any modification, equivalent replacement, or improvement made within the spirit and principle of the present disclosure shall fall within the protection scope of the present disclosure.

What is claimed is:

1. A method of clearing a notification icon, comprising:
    displaying the notification icon in a user interface on a screen of a terminal device, wherein the displayed notification icon overlaps at least partially an application icon of an application in the user interface;
    acquiring, by a processor of the terminal device, an identifier of the application corresponding to the displayed notification icon;
    adding, by the processor, the application identifier to a list of applications corresponding to to-be-cleared notification icons in response to the application identifier meeting a preset rule, the list of applications comprising application identifiers of the applications corresponding to the to-be-cleared notification icons;
    invoking, by the processor, an application programming interface (API) according to the application identifier of the application corresponding to the to-be-cleared notification icon, in response to receiving a clearing command; and
    removing, by the processor, the displayed notification icon from the user interface on the screen via the application programming interface, according to the application identifier which is comprised in the list.

2. The method according to claim 1, wherein the acquiring of the list of applications corresponding to to-be-cleared notification icons, further comprises:
    when a notification icon display request is detected, acquiring an application identifier of an application corresponding to a notification icon requested to be played; and
    determining whether the application identifier of the application corresponding to the notification icon meets a preset rule, and adding the application identifier to the list if the application identifier meets the preset rule.

3. The method according to claim 1, wherein before the acquiring of the list of applications corresponding to to-be-cleared notification icons, the method further comprises:
    receiving the preset rule, wherein the preset rule is a first preset rule or a second preset rule, wherein the first preset rule comprises an application identifier of an application whose notification icon is allowed to be cleared when the clearing command is received, and the second preset rule comprises an application identifier of an application whose notification icon is not allowed to be cleared when the clearing command is received.

4. The method according to claim 2, wherein before the acquiring of the list of applications corresponding to to-be-cleared notification icons, the method further comprises:
    receiving the preset rule, which the preset rule is a first preset rule or a second preset rule, wherein the first preset rule comprises an application identifier of an application whose notification icon is allowed to be cleared when the clearing command is received, and the second preset rule comprises an application identifier of an application whose notification icon is not allowed to be cleared when the clearing command is received.

5. The method according to claim 1, wherein the list further comprises the numbers of notifications indicated by the to-be-cleared notification icons, and correspondingly, after the stopping displaying of the notification icon corresponding to the application identifier, the method further comprises:
    calculating a sum of the numbers of notifications indicated by the notification icons stopped being displayed, and outputting the sum of the numbers of notifications as a statistical result.

6. The method according to claim 1, further comprises:
    changing a state of a notification message corresponding to the removed notification icon from a first state to a second state, wherein the first state indicates the notification message has not been read and the second state indicates the notification message has been read.

7. An apparatus of clearing a notification icon, comprising:
    a screen;
    at least one processor; and
    a memory having processor-executable instructions stored therein, and the instructions when executed by the at least one processor, configure the apparatus to:
    display the notification icon in a user interface on the screen, wherein the displayed notification icon overlaps at least partially an application icon of an application in the user interface;
    acquire an identifier of the application corresponding to the displayed notification icon;
    add the application identifier to a list of applications corresponding to to-be-cleared notification icons in response to the application identifier meeting a preset rule, the list of application comprising application identifiers of the applications corresponding to the to-be-cleared notification icons;

invoke an application programming interface (API) according to the application identifier of the application corresponding to the to-be-cleared notification icon, in response to receiving a clearing command; and remove the displayed notification icon from the user interface on the screen via the application programming interface, according to the application identifier which is comprised in the list.

8. The apparatus according to claim 7, wherein the apparatus is further configured to:

when a notification icon display request is detected, acquire an application identifier of an application corresponding to a notification icon requested to be played; and determine whether the application identifier of the application corresponding to the notification icon meets a preset rule, and add the application identifier to the list if the application identifier meets the preset rule.

9. The apparatus according to claim 7, wherein the apparatus is further configured to:

receive the preset rule, wherein the preset rule is a first preset rule or a second preset rule, wherein the first preset rule comprises an application identifier of an application whose notification icon is allowed to be cleared when the clearing command is received, and the second preset rule comprises an application identifier of an application whose notification icon is not allowed to be cleared when the clearing command is received.

10. The apparatus according to claim 8, wherein the apparatus is further configured to:

receive the preset rule, which the preset rule is a first preset rule or a second preset rule, wherein the first preset rule comprises an application identifier of an application whose notification icon is allowed to be cleared when the clearing command is received, and the second preset rule comprises an application identifier of an application whose notification icon is not allowed to be cleared when the clearing command is received.

11. The apparatus according to claim 7, wherein the list further comprises the numbers of notifications indicated by the to-be-cleared notification icons, and correspondingly the apparatus is further configured to:

calculate a sum of the numbers of notifications indicated by the notification icons stopped being displayed, and output the sum of the numbers of notifications as a statistical result.

12. The apparatus according to claim 7, wherein the apparatus is further configured to:

change a state of a notification message corresponding to the removed notification icon from a first state to a second state, wherein the first state indicates the notification message has not been read and the second state indicates the notification message has been read.

13. A non-transitory computer readable storage medium comprising computer executable instructions, the computer executable instructions being used for executing a method of clearing a notification icon when executed by a computer processor, and the method comprising:

displaying the notification icon in a user interface on a screen of a terminal device, wherein the displayed notification icon overlaps at least partially an application icon of an application in the user interface;

acquiring, by the processor, an identifier of the application corresponding to the displayed notification icon;

adding by the processor, the application identifier to a list of applications corresponding to to-be-cleared notification icons in response to the application identifier meeting a preset rule, the list of applications comprising application identifiers of the applications corresponding to the to-be-cleared notification icons;

invoking, by the processor, an application programming interface (API) according to the application identifier of the application corresponding to the to-be-cleared notification icon, in response to receiving a clearing command; and removing, by the processor, the displayed notification icon from the user interface on the screen via the application programming interface, when a clearing command is received and according to the application identifier which is included in the list.

* * * * *